United States Patent [19]
Ruetz

[11] Patent Number: 4,903,489
[45] Date of Patent: Feb. 27, 1990

[54] SUPERCHARGED MULTI-CYLINDER RECIPROCATING PISTON-INTERNAL COMBUSTION ENGINE WITH SEVERAL EXHAUST GAS TURBOCHARGERS OPERATING IN PARALLEL

[75] Inventor: Georg Ruetz, Immenstaad, Fed. Rep. of Germany

[73] Assignee: MTU Motoren- und Turbinen-Union Friedrichshafen GmbH, Fed. Rep. of Germany

[21] Appl. No.: 236,352
[22] PCT Filed: Sep. 23, 1987
[86] PCT No.: PCT/DE87/00432
§ 371 Date: Jul. 6, 1988
§ 102(e) Date: Jul. 6, 1988
[87] PCT Pub. No.: WO88/06232
PCT Pub. Date: Aug. 25, 1988

[30] Foreign Application Priority Data
Feb. 17, 1987 [DE] Fed. Rep. of Germany ....... 3704967

[51] Int. Cl.⁴ ............................................. F02B 37/00
[52] U.S. Cl. .................................................... 60/612
[58] Field of Search ................... 60/612; 123/198 DB

[56] References Cited
U.S. PATENT DOCUMENTS
4,422,296 12/1983 Dinger et al. .................... 60/612 X FOREIGN PATENT DOCUMENTS
183047 10/1984 Japan .
231134 12/1984 Japan .
2030646 4/1980 United Kingdom .
2034815 6/1980 United Kingdom .
2089425 6/1982 United Kingdom .................. 60/612
2115873 9/1983 United Kingdom .

Primary Examiner—Michael Koczo
Attorney, Agent, or Firm—Barnes & Thornburg

[57] ABSTRACT

During idling or partial load of the reciprocating piston-internal combustion engine, the exhaust gas turbocharger (18) is shut-down and the fuel supply is interrupted with some cylinders (12). An optimum charging air supply matched to the operating condition of the reciprocating piston-internal combustion engine results by a controllable shifting device (32) in the charging air line section (14) of the shut-down cylinders (12). The passage from the charging air line (19) to the charging air line section (14) is closed by the shifting device (32) during operating periods with interruption of the fuel supply to the cylinders (12). At the same time, a passage opens from a suction opening (33) to the charging air line section (14), through which the air requirement of the disabled cylinders (12) is covered. The interconnected exhaust gas turbocharger (17) thereby operates in a favorable operating range.

17 Claims, 2 Drawing Sheets

SUPERCHARGED MULTI-CYLINDER RECIPROCATING PISTON-INTERNAL COMBUSTION ENGINE WITH SEVERAL EXHAUST GAS TURBOCHARGERS OPERATING IN PARALLEL

DESCRIPTION

The invention relates to a supercharged multi-cylinder reciprocating piston-internal combustion engine with several exhaust gas turbochargers operating in parallel with at least one of the turbochargers being selectively interconnected. An optimum charging air supply matched to the operating condition of the reciprocating piston-internal combustion engine is attained with such an arrangement.

A reciprocating piston-internal combustion engine of the aforementioned type is known from the DE-PS 28 38 952 (corresponding to U.S. Pat. No. 4,299,090) in which one exhaust gas turbocharger is coordinated to each cylinder row. So-called blocking air seals for limiting lubricating oil losses are arranged at the rotors of the exhaust gas turbochargers, which blocking air seals are supplied with compressed air from the charging air line of the reciprocating piston-internal combustion engine. When turning-off one cylinder row, the associated exhaust gas turbocharger is stopped by closing-off the exhaust gas supply to the turbine. The air supply of the shut-down cylinders operated as compressor takes place either through the idle charging air compressor or by way of additional suction valves at the cylinders directly out of the atmosphere. During this operating condition, no positive charging air pressure is present in the charging air compressor of the shut-down exhaust gas turbocharger and in the charging air line of the shut-down cylinders. The excess pressure necessary for the functioning ability of the blocking air seals is therewith lacking. The lubricating oil supply is not interrupted during the temporary shut-down of the exhaust gas turbocharger. With lacking blocking air pressure, lubricating oil escapes through the blocking air seals. The leakage oil collects as a pool in the spiral housing of the exhaust gas turbine and charging air compressor of the shut-down exhaust gas turbocharger. When connecting-in the exhaust gas turbocharger, the leakage oil pool is pulled out of the spiral housing of the charging air compressor by the charging air stream into the charging air manifold which leads to operation-endangering overheating in the associated cylinders. Leakage oil escaping at the exhaust gas turbine leads to coking and to uncontrollable exhaust gas fire with damages endangering the operation at the rotor and the exhaust gas installation.

It is therefore an object of the invention to create a reciprocating piston-internal combustion engine in which, during operating periods with small partial load, a pressure lying above the atmospheric pressure remains preserved in the charging air manifold also after shutting-down of the exhaust gas turbochargers and shutting down of some cylinders.

This object is achieved according to the invention by providing an arrangement wherein atmospheric air is supplied to the disabled group of cylinders so as to provide atmospheric air pressure in the active supercharged air line from which air for the air seal is obtained.

The advantages attained with the invention reside in particular in that by decoupling of the air supply for the shut-down cylinders, the air mass flow rate of the non-disconnectable exhaust gas turbocharger produces an operation in the optimum operating range and increased pressure condition, in that during idling and partial load, a charging air pressure lying above the atmospheric air pressure is achieved in the charging air line system, in that during the operation periods with shut-down cylinders, also the charging air compressor of the shut-down exhaust gas turbocharger is acted upon with the charging air pressure prevailing in the charging air line system as a result of the closure device arranged on the suction side, in that the blocking air seals at the rotors of both exhaust gas turbochargers are supplied adequately with compressed air by the increased charging air pressure, which prevents lubricating oil from escaping into the spiral housing and in that with the improved charging air supply of the non-shut-down cylinders, the operation of the reciprocating piston internal combustion engine is improved during idling and in the partial load range.

Constructional examples of the invention are schematically illustrated in the drawing and will be described more fully hereinafter.

DETAILED DESCRIPTION OF THE DRAWINGS

Figure 1:
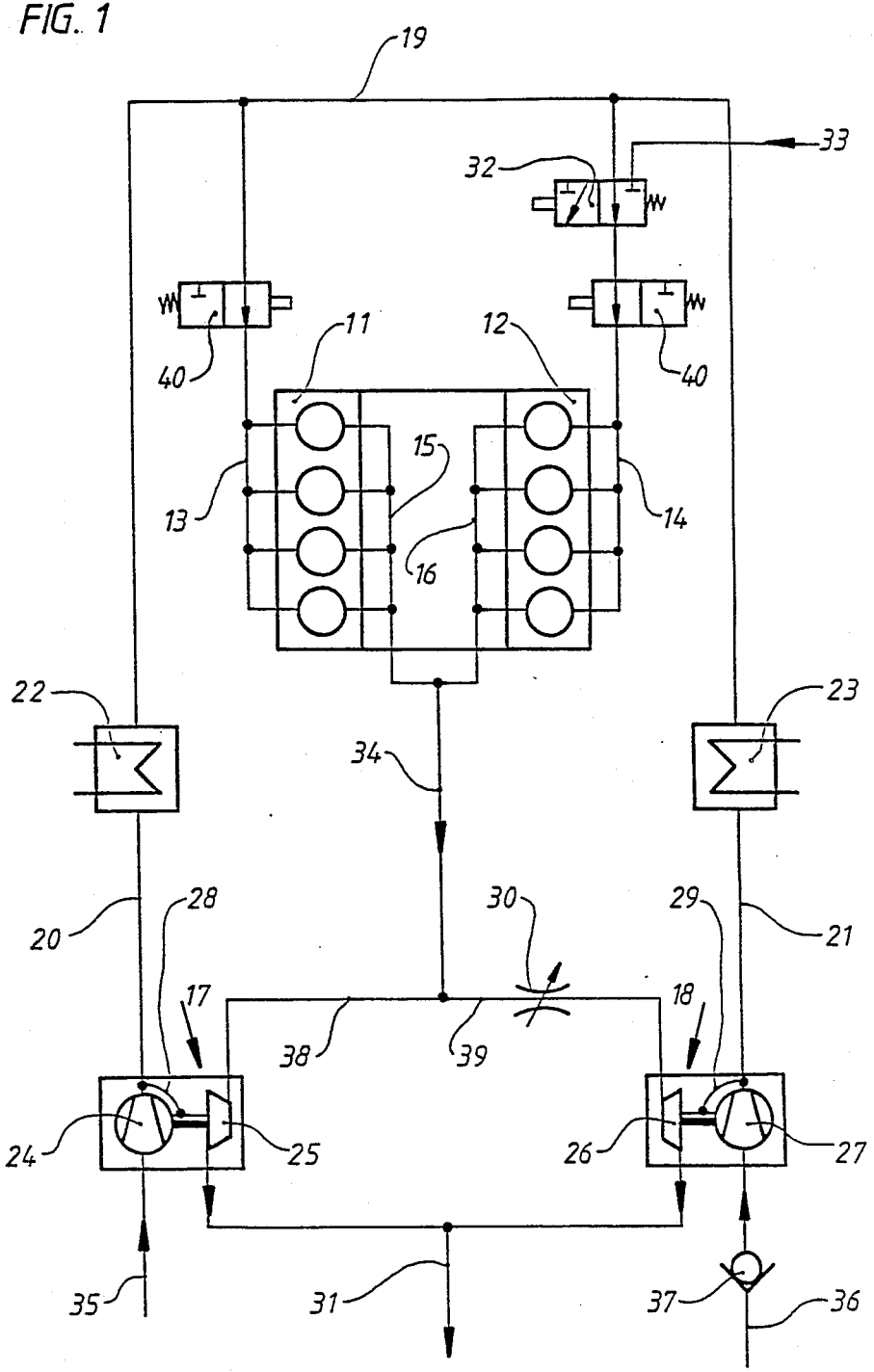
FIG. 1 schematically shows supercharged internal combustion engine with two cylinder rows and two exhaust gas turbochargers operating in parallel, constructed according to a preferred embodiment of the invention.

A reciprocating piston internal combustion engine consists of two groups of cylinders 11 and 12 which are supplied with precompressed charging air from a charging air manifold 19 by way of one charging air line section 13, 14 each. Exhaust gas line sections 15, 16 are coordinated to the cylinder groups 11, respectively, 12 which terminate in an exhaust gas manifold 34. The charging air supply takes place by two exhaust gas turbochargers 17 and 18 arranged at the reciprocating piston internal combustion engine and operating in parallel which consist each of an exhaust gas turbine 25, respectively, 26 and of a charging air compressor 24, respectively, 27.

The exhaust gas turbocharger 18 is constructed disconnectable and connectable by a controllable closure device 30 arranged in the exhaust gas line 39. During operating periods with reduced exhaust gas supply of the reciprocating-piston internal combustion engine, the charging air supply takes place exclusively by the exhaust gas turbocharger 17 with shut-down exhaust gas turbocharger 18. In order that no charging air can escape through the charging air compressor 27 during the disconnection of the exhaust gas turbocharger 18, an automatically closing closure device 37 is arranged in the charging air suction line 36.

The exhaust gas turbines 25, 26 are connected on the inlet side by way of the exhaust gas lines 38, 39 to the exhaust gas manifold 34 and, on the outlet side to the exhaust line 31. The charging air compressors 24, 25 are connected to the charging air suction lines 35, respectively, 36 and supply compressed charging air by way of lines 20, 21 and charging air coolers 22, 23 to the charging air manifold 19. At each of the pressure-oil-lubricated exhaust gas turbochargers 17, 18, blocking air seals for limiting lubricating oil losses are arranged at the rotors, which blocking air seals are supplied with compressed air from the charging air line 20, respectively, 21, by way of a line 28, respectively 29.

The cylinders 12 are shut down during idling and at partial load by a device not further shown for the interruption of the fuel supply and rotate along without power output. As the valve control periods with the shut-down cylinders 12 are not changed, a charge cycle of air takes place in the cylinders 12 in the shut-down condition.

During idling and during partial load, the exhaust gas offer of the reciprocating piston internal combustion engine is small. Even with shut-down exhaust gas turbocharger 18, the exhaust gas offer supplies too little driving power in order to produce by means of the exhaust gas turbocharger 17 a charging pressure lying above the atmospheric air pressure even though the air mass requirement of the shut-down cylinders must be covered also by the charging air compressor 24.

With too low a charging air pressure or with a lacking charging air pressure, the blocking air seals at the rotors of both exhaust gas turbochargers 17, 18 are no longer capable of functioning so that lubricating oil can escape through the blocking air seals.

A shifting device 32 arranged between charging air manifold 19 and charging air line section 14 of the shut-down cylinders 12 according to FIG. 1 provides a remedy.

During the interruption of the fuel supply for the cylinders 12, the connection between the charging air manifold 19 and the charging air line section 14 is interrupted by actuation of the shifting device 32. At the same time, the shifting device 32 establishes a connection between the charging air line section 14 and a suction opening 33 terminating in the atmosphere which serves for the air supply of the shut-down cylinders 12. The interconnected exhaust gas turbocharger 17 is thereby relieved on the compressor side of the air mass requirement of the shut-down cylinders 12. The exhaust gas turbine 25, however, operates with a mass flow rate which is composed of the gas flow rate of the cylinders 12 and the exhaust gas mass stream of the cylinders 11 supplied with fuel. The compressor 24 of the exhaust gas turbocharger 17 operates with the increased driving power output resulting therefrom in a favorable operating range so that a charging air pressure lying above the atmospheric pressure establishes itself in the charging air lines 13, 19, 20, 21.

An excess pressure sufficient for the effectiveness of the blocking air seals is thus always present.

A safety rapid shut-off device 40 is arranged in each charging air line section 13, 14, which, in case of danger, is closed for the rapid shut-down of the reciprocating piston internal combustion engine. The shifting device 32 is series-connected ahead of the safety rapid shut-off device 40 in the charging air line section 14 as viewed in the flow direction of the charging air.

Figure 2:
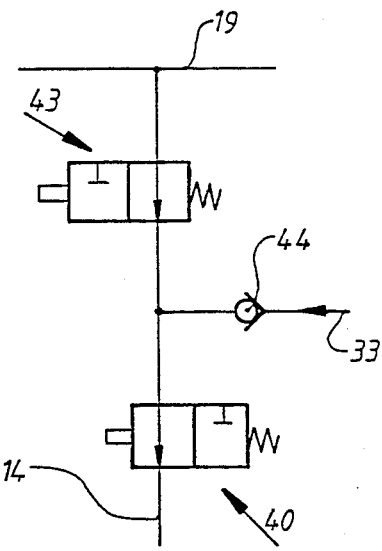
FIGS. 2 to 4 are partial schematic views showing variations of the charging air line section adapted to be closed of the disconnectable cylinders, constructed according to respective alternate preferred embodiments of the invention.

According to FIG. 2, the controllable device 43 and the suction opening 33 are constructed as mutually independent components. A check valve 44 is thereby coordinated to the suction opening 33 which is kept closed by the prevailing charging air pressure in the open position of the device 43 and opens during shut-down operation of the cylinders 12.

Figure 3:
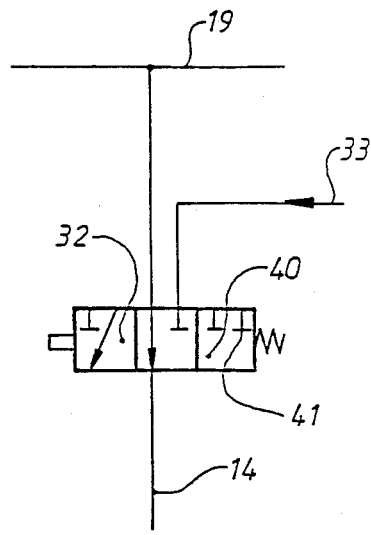

According to FIG. 3, shifting device 32 and safety rapid shut-off device 40 are constructed as a combination apparatus. In the rapid shut-off position, the passage of the suction opening 33 to the charging air line section 14 is also closed by a closing device 41.

Figure 4:
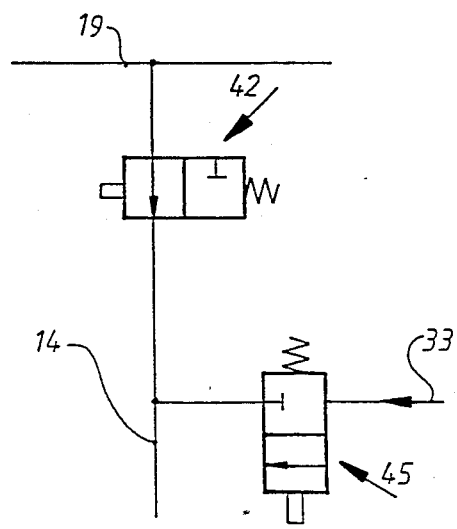

In the modification according to FIG. 4, the arrangement for the blocking of the charging air line section 14 and the safety rapid shut-off device are combined into a shifting device 42. In this embodiment, it is necessary to construct the passage from the suction opening 33 to the charging air line section 14 so as to be adapted to be closed by a controllable device 45. The suction opening 33 is closed when the rapid shut-down device responds or the cylinders 12 are supplied with fuel.

I claim:

1. A supercharged internal combustion engine comprising:
    a first group of engine cylinders,
    a first charging air line for supplying charging air to said first group of cylinders,
    a second group of engine cylinders,
    a second charging air line for supplying charging air to said second group of cylinders,
    a first exhaust gas operated turbocharger arranged in an engine exhaust line, said first turbocharger including means for charging air in a first supercharged charging air line,
    a second exhaust gas operated turbocharger arranged in the engine exhaust line in parallel to the first turbocharger, said second turbocharger including means for charging air in a second supercharged charging air line,
    cylinder group disabling means for selectively disabling the operation of the second group of cylinders by cutting off fuel flow thereto,
    turbocharger disabling means for selectively disabling the operation of the second turbocharger by disconnecting the engine exhaust line from the second turbocharger,
    charging air connecting means for connecting both the first and second supercharged charging air lines to the first and second charging air lines during engine operation with both the first and second groups of cylinders,
    charging air disconnecting means for disconnecting the second charging air line from the first and second supercharged air lines during engine operation with the second group of cylinders disabled,
    and atmospheric air supply means for communicating the second charging air line to local atmospheric air when the second group of cylinders is disabled and disconnected from the supercharged air lines.

2. An engine according to claim 1, wherein said charging air disconnecting means and said atmospheric air supply means are constructed as a combined control valve assembly.

3. An engine according to claim 2, further comprising a safety rapid shut down means arranged in the second charging air line.

4. An engine according to claim 3, wherein said safety rapid shut down means is constructed as part of a combined control valve assembly.

5. An engine according to claim 1, further comprising a safety rapid shut down means arranged in the second charging air line.

6. An engine according to claim 5, wherein said safety rapid shut down means is constructed as a separate shut down valve disposed downstream of both the charging air disconnecting means and the atmospheric air supply means.

7. An engine according to claim 5, wherein said safety rapid shut own means is constructed as part of a combined valve forming a part of said atmospheric air supply means.

8. An engine according to claim 1, wherein a one-way check valve is disposed upstream of the second turbocharger for preventing escape of charging air out through the second turbocharger when it is disconnected.

9. An engine according to claim 1, wherein said charging air disconnecting means is a shut off valve disposed in the second charging air line, and wherein the atmospheric air supply means includes a branch line opening into the second charging air line at a position downstream of the shut off valve, a check valve being disposed in the branch line so as to be closed by the pressure in the second charging air line during normal engine operation with supercharged air supply and to be opened by atmospheric pressure when the shut off valve is closed.

10. An engine according to claim 9, further comprising a safety rapid shut down means arranged in the second charging air line.

11. An engine according to claim 10, wherein said safety rapid shut down means is disposed in the second charging line downstream of the branch line.

12. An engine according to claim 5, further comprising a further safety rapid shut down means arranged in the first charging air line.

13. An engine according to claim 11, further comprising a further safety rapid shut down means arranged in the first charging air line.

14. An engine according to claim 1, further comprising air seal bearing line means leading from the first supercharged air line to an air seal bearing at the first turbocharger.

15. An engine according to claim 14, further comprising air seal bearing line means leading from the second supercharged air line to an air seal bearing at the second turbocharger.

16. An engine according to claim 14, wherein a one-way check valve is disposed upstream of the second turbocharger for preventing escape of charging air out through the second turbocharger when it is discontinued.

17. An engine according to claim 12, further comprising air seal bearing line means leading from the first supercharged air line to an air seal bearing at the first turbocharger.

* * * * *